United States Patent
Swaminathan et al.

(10) Patent No.: US 9,853,957 B2
(45) Date of Patent: Dec. 26, 2017

(54) DRM PROTECTED VIDEO STREAMING ON GAME CONSOLE WITH SECRET-LESS APPLICATION

(71) Applicant: Adobe Systems Incorporated, San Jose, CA (US)

(72) Inventors: Viswanathan Swaminathan, Saratoga, CA (US); Sheng Wei, San Jose, CA (US); Joseph Donovan Steele, Danville, CA (US)

(73) Assignee: ADOBE Systems Inc., San Jose, CA (US)

( * ) Notice: Subject to any disclaimer, the term of this patent is extended or adjusted under 35 U.S.C. 154(b) by 0 days.

(21) Appl. No.: 15/246,965

(22) Filed: Aug. 25, 2016

(65) Prior Publication Data

US 2016/0366116 A1    Dec. 15, 2016

Related U.S. Application Data

(62) Division of application No. 14/183,680, filed on Feb. 19, 2014.

(51) Int. Cl.
*H04L 29/06* (2006.01)
*G06F 21/00* (2013.01)
*G06F 21/10* (2013.01)
*G06F 21/33* (2013.01)
*H04L 29/08* (2006.01)

(52) U.S. Cl.
CPC .......... *H04L 63/061* (2013.01); *G06F 21/10* (2013.01); *G06F 21/33* (2013.01); *H04L 63/0428* (2013.01); *H04L 63/0435* (2013.01); *H04L 63/0492* (2013.01); *H04L 63/06* (2013.01); *H04L 63/08* (2013.01); *H04L 63/0807* (2013.01); *H04L 63/0815* (2013.01); *H04L 65/608* (2013.01); *H04L 67/02* (2013.01)

(58) Field of Classification Search
CPC .. G06F 21/10; G06F 21/6218; G06F 2221/07; H04L 63/0815; H04L 63/0428; H04L 63/08; H04L 63/06
See application file for complete search history.

(56) References Cited

U.S. PATENT DOCUMENTS 6,134,660 A * 10/2000 Boneh ................. G06F 21/6209
380/201
6,314,660 B1   11/2001 Dangelewicz et al.
(Continued)

*Primary Examiner* — Lisa Lewis
(74) *Attorney, Agent, or Firm* — Finch & Maloney PLLC

(57) ABSTRACT

Techniques are disclosed for secure playback of protected multimedia content on a game console using a secret-less application. An SSO model can be used for client authentication at a key server, which eliminates the need of storing or using any secret information in the client application. Further, an encrypted content key generated by a content packager using a public key can be deployed in the key URI of a playlist file, which is sent to the key server. The key server can be configured to decrypt the content key using a corresponding private key. Further, the content key and unencrypted samples are protected in the game console client application from debugging and replay attacks by using additional security checks at both the client and key server. By storing secret information remotely from the game console and using the SSO model, DRM policies can be enforced on an untrusted client application.

20 Claims, 6 Drawing Sheets

(56) References Cited

U.S. PATENT DOCUMENTS

| | | | | |
|---|---|---|---|---|
| 7,555,460 B1* | 6/2009 | Barkan | G06Q 20/06 235/492 |
| 7,761,465 B1* | 7/2010 | Nonaka | G06F 21/10 707/770 |
| 2003/0200319 A1* | 10/2003 | Bodine | G06F 9/5055 709/227 |
| 2005/0039031 A1* | 2/2005 | Mont | H04L 63/0435 713/189 |
| 2005/0273629 A1* | 12/2005 | Abrams | G06F 21/10 713/189 |
| 2006/0010074 A1* | 1/2006 | Zeitsiff | G06F 21/10 705/52 |
| 2007/0300080 A1* | 12/2007 | Brown | H04L 9/0825 713/193 |
| 2008/0256592 A1* | 10/2008 | Schnell | G06F 21/10 726/1 |
| 2010/0223471 A1* | 9/2010 | Fresko | H04L 63/08 713/176 |
| 2011/0230256 A1* | 9/2011 | Adra | A63F 13/77 463/25 |
| 2012/0131343 A1* | 5/2012 | Choi | H04L 63/0815 713/168 |
| 2012/0246463 A1* | 9/2012 | Shea | H04L 63/061 713/153 |
| 2013/0326223 A1* | 12/2013 | Webb | H04L 9/0825 713/171 |
| 2014/0215214 A1* | 7/2014 | Barnes | G06F 21/10 713/171 |
| 2014/0230007 A1* | 8/2014 | Roth | G06F 21/6209 726/1 |
| 2015/0086020 A1* | 3/2015 | Harjula | H04L 9/30 380/279 |
| 2015/0149772 A1* | 5/2015 | Leavy | H04L 9/0822 713/168 |
| 2015/0156191 A1* | 6/2015 | Schmidt | H04W 12/06 726/4 |
| 2015/0235011 A1 | 8/2015 | Swaminathan et al. | |
| 2015/0278548 A1* | 10/2015 | Brands | G06F 21/6245 726/9 |

\* cited by examiner

US 9,853,957 B2

DRM PROTECTED VIDEO STREAMING ON GAME CONSOLE WITH SECRET-LESS APPLICATION

RELATED APPLICATIONS

This application is a divisional of U.S. patent application Ser. No. 14/183,680, entitled "DRM PROTECTED VIDEO STREAMING ON GAME CONSOLE WITH SECRET-LESS APPLICATION" filed on Feb. 19, 2014, which is incorporated by reference herein in its entirety.

FIELD OF THE DISCLOSURE

This disclosure relates to the field of digital media distribution, and more particularly, to secure playback of protected multimedia content using a secret-less application.

BACKGROUND

Multimedia content, including movies, television shows, and music, is increasingly being distributed over computer networks, such as the Internet, as well as on other types of media, such as digital optical discs and other data storage devices. In digital form, multimedia content is easily portable, and can be accessed using a wide array of network-connected devices. For instance, some video game consoles can be configured to play back multimedia content received from a content provider, such as Netflix, Hulu, Amazon, and others. To prevent unauthorized use of certain digital media, such as copyrighted audio and video, some content providers may employ digital rights management (DRM) technologies when distributing such so-called protected content. On some game consoles, DRM-protected content can be played back using a non-game software application that is compatible with the DRM technologies employed by the content provider. However, since many game consoles incorporate unique proprietary features designed by the console manufacturer, the ability of these applications to play back protected content may be contingent upon compliance with certain manufacturer-imposed requirements. As such, some DRM applications designed to run on one type or model of game console may not be compatible with a different game console.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
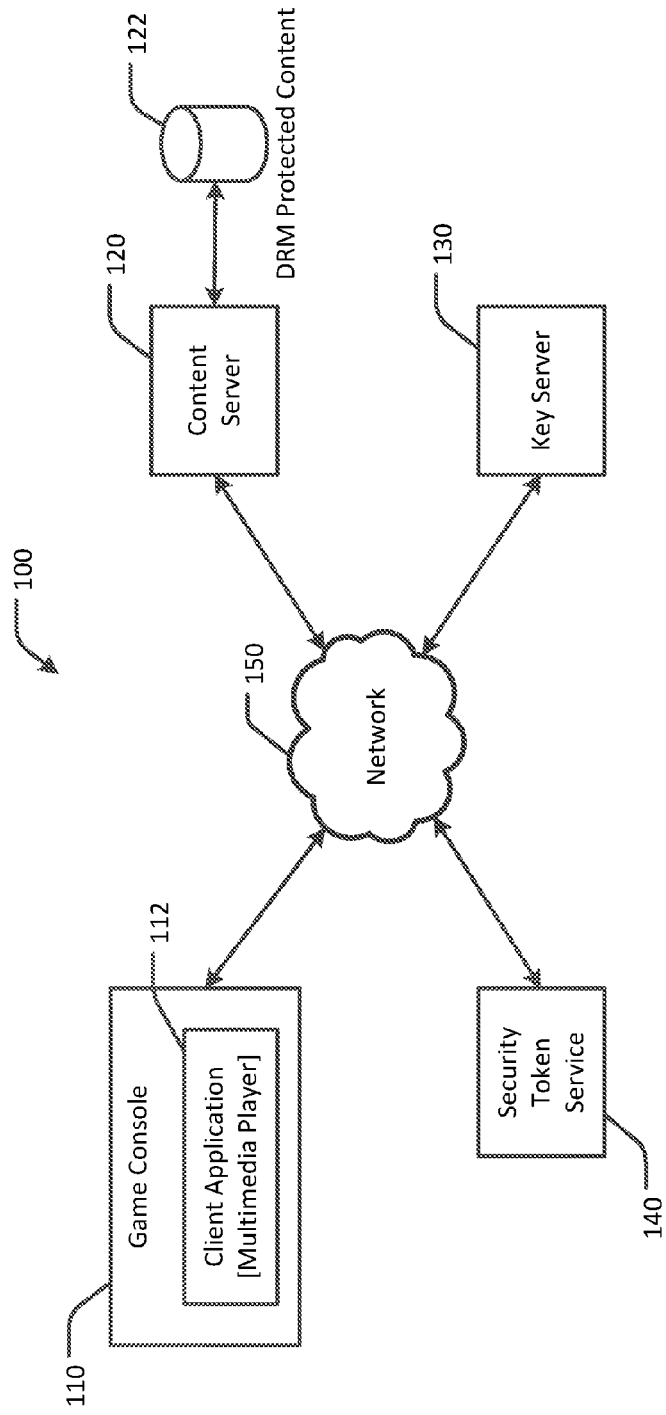
FIG. 1 illustrates an example client-server system for secure playback of protected multimedia content using a secret-less application, in accordance with an embodiment of the present invention.

As noted above, various DRM technologies have been developed to prevent unauthorized copying and distribution of certain multimedia content. DRM is a broad term encompassing a variety of different technologies and enforcement policies, often established by individual content providers or content owners. Although some standards have been proposed, DRM technologies are continuously evolving and, to date, none of the proposed standards have been universally adopted. As such, and as will be appreciated in light of this disclosure, it is non-trivial to enable secure video streaming on certain game consoles, such as the Xbox 360® game console sold by Microsoft Corporation of Redmond, Wash., due to the fact that such game consoles employ different hardware and different media framework (e.g., Microsoft MMFPP/Silverlight), streaming mechanism (e.g., Microsoft Smooth Streaming), and DRM security models (e.g., Microsoft PlayReady and Xbox Live® single sign on model), compared to other existing consoles that support DRM technologies. For example, some third-party multimedia players utilize private cryptographic keys for accessing encrypted content. These so-called secret keys may be embedded either in the multimedia player or in a certificate accessible by the player. However, some game consoles have proprietary security models and media frameworks that do not permit applications to access secret keys and, as such, are incompatible with non-native DRM technologies. In particular, certain game consoles (e.g., Xbox 360®) require applications to be integrated with a single sign on (SSO) model that utilizes an external security service (e.g., Xbox Live® services) for security token exchange and verification. Furthermore, on certain game console applications (e.g., Xbox 360®), non-native DRM content decryption is conducted at the software level, which can expose the secret keys to malicious attacks on the multimedia player. Also, on certain game consoles (e.g., Xbox 360®), an attacker can access operating system-level debuggers at runtime to extract any secret keys stored in a client application.

To this end, and in accordance with an embodiment of the present invention, techniques are disclosed for secure playback of protected multimedia content on a game console using a secret-less application. A secret-less application is one in which there is no secret or cryptographic key unique to the application that is embedded in the application or in a certificate associated with the application. The game console may, for example, be an Xbox 360® or other game console configured to stream protected multimedia content. An SSO model (e.g., Xbox Live®) can be used for client authentication at a key server, which eliminates the need of storing or using any secret information in the client application. Further, an encrypted content key can be generated by a content packager using a public cryptographic key. The encrypted content key can be deployed in the key server uniform resource identifier (URI) of a playlist file and sent to the key server during the client's key request. The key server can be configured to decrypt the content key using a corresponding private key upon completing a successful authentication of a SSO token. Further, the content key and unencrypted content are protected in the game console client application from debugging and replay attacks by using additional security checks at both the client and key server. By storing secret information (e.g., the private key) remotely from the game console and using the SSO model, DRM policies can be enforced on a secret-less game console client application. Numerous configurations and variations will be apparent in light of this disclosure.

As used herein, the terms "content" and "multimedia content," in addition to their plain and ordinary meanings, include audio, video, data, graphics, or any other information that can be identified, addressed, referenced or handled in any networked information system, such as the World Wide Web, or any information that can be delivered from a publisher to an end-user via physical media, such as a portable USB drive, CD, DVD or Blu-ray disc. In general, content includes any form of information in digital form; however, content may be embodied in non-digital forms (e.g., analog) or a combination of digital and non-digital forms.

As used herein, the term "protected content," in addition to its plain and ordinary meaning, includes content that is controlled within a secure environment and to which access is restricted to entities (e.g., clients, servers, applications, scripts, components, etc.) authorized by the owner or publisher of the content. Some specific examples of protected content include data, electronic documents, files, web pages, images, objects, services, and collections of resources and/or generally anything that has an identity and can be referenced in some manner. Protected content that is secured under an OAuth framework, for example, may be accessed by the third party application using Hypertext Transfer Protocol (HTTP) messages, specifically including the HTTP/1.1 standard protocol (currently defined by the Internet Engineering Task Force (IETF) Request for Comments (RFC) 2616), although it will be apparent in light of this disclosure that other application and authentication protocols can be used to access protected resources using the techniques disclosed herein. An access control mechanism may be used to control access to the content. The access control mechanism may, for example, include any DRM technology that limits use of the content to devices and applications possessing an appropriate security credential. One form of protected content is content that is encrypted using a suitable encryption algorithm. Encrypted content is generally unusable until decrypted using a suitable decryption algorithm, which may depend on a secret cryptographic key.

As used herein, the term "security token," in addition to its plain and ordinary meaning, includes data used to authorize use of a service. For example, a security token may include data representing a digital credential or other authority that is recognized by a third party.

In an example embodiment of the present invention, a methodology is provided for secure playback of protected multimedia content on a game console using a secret-less application in which no secret information (e.g., cryptographic keys, tokens and the like) is stored, embedded or visible. The methodology includes a secure content key delivery protocol, which leverages the SSO model to prevent security attacks in an untrusted client environment. A content packager can create and encrypt protected content. The content packager can also create and sign a security token. For delivering the content key to the client, the signed security token can be embedded in the key URI of a protected content playlist, which can be used by a game console client application for requesting a content key through a remote service.

In some embodiments, a client-side (e.g., game console) security scheme can be used to protect both the content decryption key and the decrypted content on the client. In an example embodiment, the security scheme includes obfuscation of the client application execution code to prevent reverse engineering and static code analysis. Code obfuscation may include, for example, renaming, metadata removal, flow control obfuscation, string encryption, or any combination thereof. In another example embodiment, the security scheme includes anti-debugging features encoded in the client application to prevent possible debugging attacks at the managed code level. In such cases, an Application Programming Interface (API) that is native to the game console operating system may be invoked by the client application to check for any debugger code and, if so, force the debugger code to fail before security-sensitive portions of the client application are executed. In another example embodiment, the security scheme includes anti-debugging code at the kernel level to prevent lower level debugging attempts (e.g., by using a kernel debugger). This may be accomplished using (i) error-detecting code to detect changes to security sensitive code blocks, which ensures that there is no breakpoint inserted in the code block, and (ii) ensuring that the game console does not have certain security privileges (e.g., developer privilege) by leveraging the separation of game console developer network and production network. One or more of the above security schemes may be used in any combination.

In some embodiments, a server-side (e.g., key server) authentication scheme can be implemented to prevent SSO token replay attacks. A replay attack is one in which valid data is transmitted or intercepted for malicious or fraudulent purposes, such as for use by an unauthorized party. In an example embodiment, a key server conducts a security check on an SSO token received from a game console client application to ensure that the received token corresponds to the same game console that the token was originally issued to. In particular, the key server can check whether the IP address of the sender matches with that claimed in the token. The key server may, in some cases, examine the time expiry information in the SSO token to determine whether the token has expired. In some such cases, the expiration time of a token may be customized via the SSO services to manage the trade-off between security (e.g., the difficulty level for a reply attack) and performance (e.g., the frequency at which the game console client application requests new tokens).

Example System for DRM Protected Video Streaming

FIG. 1 illustrates an example client-server system 100 for secure playback of protected multimedia content on a game console using a secret-less application, in accordance with an embodiment. The system 100 includes a game console 110, a content server 120, a key server 130, and a security token service 140, each electronically interconnected via a network 150. Generally, the game console 110 can be any type of device, such as an Xbox 360® game console, configured to access and use protected content 122. The protected content 122 may, for example, be distributed by the content server 120 in an encrypted form or in conjunction with other suitable security measures so as to prevent its use by unauthorized recipients. The game console 110 includes a client application 112 configured to play back the protected content 122. One or more storage devices for storing the protected content 122 may be operatively connected to the content server 120. The security token service 140 can issue security credentials (e.g., an SSO token) to the client application 112 for use in accessing the protected content 122.

In use, the system 100 provides a client-server environment for playing the protected content 122 on the game console 110 without storing any secret information in the client application 112. Generally, access to the protected content 122 can be granted to the client application 112 if the game console 110 holds valid security credentials for the protected content. However, in some cases the client application 112 cannot hold certain security credentials due to constraints imposed by the game console hardware, media framework, streaming mechanism, DRM security model, or any combination of these, such as discussed above. Thus, the key server 130, which is trusted by the security token service 140, can authorize the game console 110 to access the protected content 122 by providing a content decryption key or other digital authority to the game console 110. The content key may then be used by the client application 112 to access the protected content 122.

Figure 2:
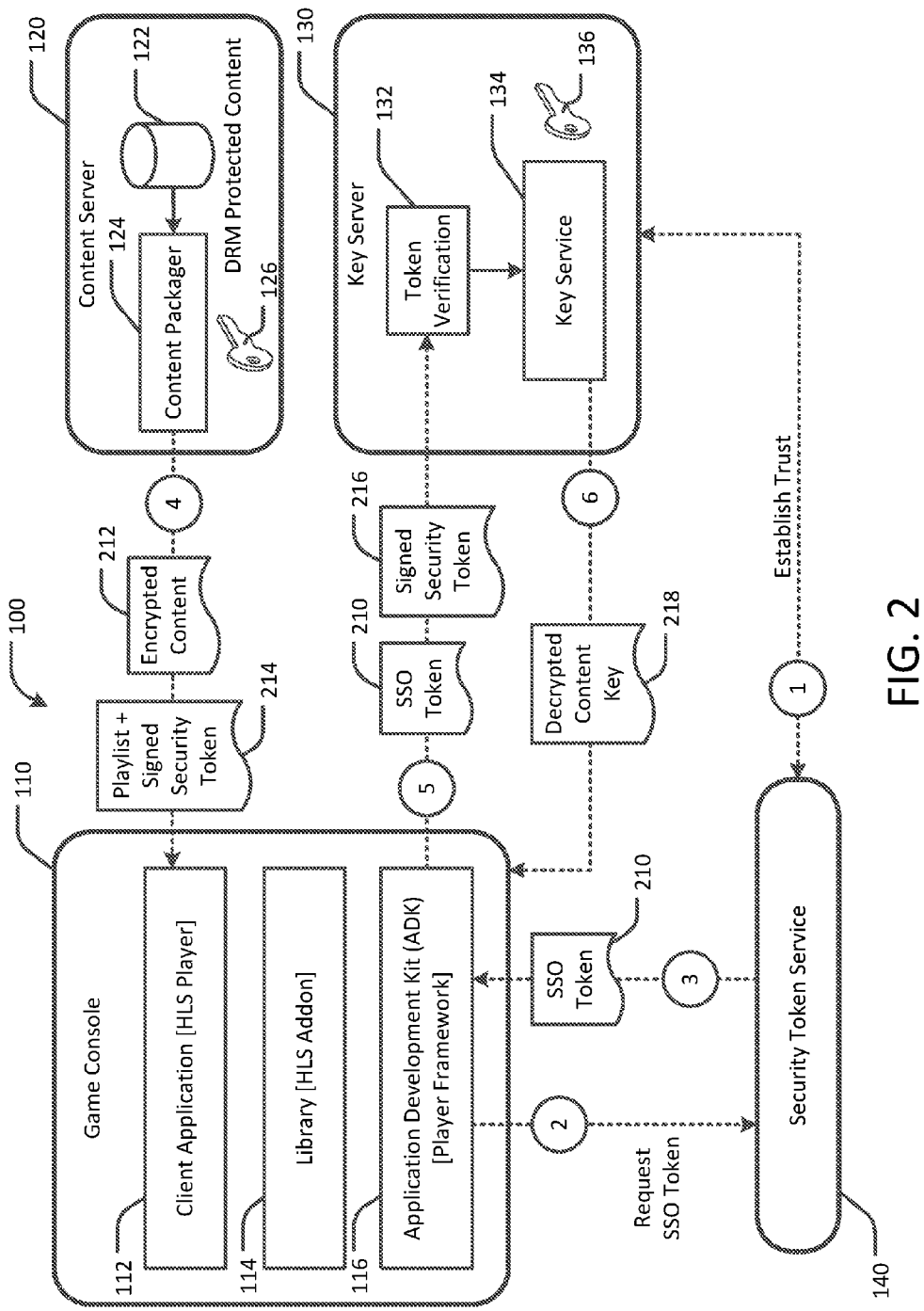
FIG. 2 illustrates the client-server system of FIG. 1 in further detail, in accordance with an embodiment of the present invention.

FIG. 2 illustrates the client-server system 100 of FIG. 1 in further detail, in accordance with an embodiment. In addition to the client application 112, the game console 110 includes a library module 114 and an Application Development Kit (ADK) module 116. The client application 112 may, for example, include an HTTP Live Streaming (HLS) player application for processing (e.g., playing) multimedia content. The library module 114 may, for example, provide functionality for accessing a specific type of multimedia content, such as multimedia content provided by a subscription service. The ADK module 116 may, for example, provide additional functionality for accessing protected content, such as authentication, decryption, or other security-related functions. The content server 120 includes a content packager module 124. The key server 130 may include a token validation module 132 and a key service module 134. The security token service 140 may include, for example, the Xbox Live® service provided by Microsoft Corp. Xbox Live® includes online (e.g., Internet accessible) game and media delivery services for the Xbox® game console. As noted above, the game console 110 can be in communication with the media server 120, the key server 130, the security token service 140, or any combination thereof, via one or more communication networks 150, such as the Internet, a wide area network or a local area network. The various components of the system 100 may be provided by one or more entities. For example, the game console 110 may be an end-user device, while the media server 120, the key server 130 and security token service 140 may be provided by one or more third-parties.

In use, a game console user can register the game console 110 with the security token service 140 so that the user can access certain multimedia content provided by the content server 120. The system 100 can be configured to perform any of the functions described in the following example. As indicated at reference number 1, the security token service 140 can establish a trusted relationship with the key server 130. This process may be performed once or as often as needed to maintain the trusted relationship. By establishing this trusted relationship, the key server 130 may authenticate an access token 210 issued by the security token service 140 when such tokens are received from the game console 110. The game console 110 can utilize the security token service 140 to obtain the access token 210 (e.g., an SSO token) for accessing the protected content 122. In particular, as indicated at reference number 2, the ADK 116 can request the access token 210 from the security token service 140 using, for example, a username/password combination or other suitable user-specific credentials. If the security token service 140 validates the credentials supplied in the request, the security token service can return the access token 210 to the ADK 116, as indicated at reference number 3. It will be noted that the ADK 116, rather than the client application 112, can store and use the access token 210. In this manner, it is not necessary for the client application 112 to store secret information associated with accessing the protected content 122, including the access token 210.

The content server 120 is configured to send a playlist 214 to the game console 110, as indicated at reference number 4. The playlist 214 is a file that stores a multimedia playlist. For example, the playlist 214 may be an M3U or M3U8 format file that specifies the location of the protected content 122 (e.g., a universal resource locator (URL)). The content server 120 is further configured to send the protected content 122 to the game console 110 as encrypted content 212. In particular, the content packager 124 is configured to encrypt the protected content 122 using a content key 126. The content packager 124 can encrypt the protected content 122 at any time (e.g., in advance of sending the playlist to the game console 110 or "just in time" as the playlist is being sent to the game console). The protected content 122 may be sent, for example, as streaming video or audio, in which the content is delivered to the game console 110 in several segments rather than in a single large data file. The content packager 124 is further configured to generate a signed security token, which includes, but is not limited to: (1) the content key encrypted by the content packager using the content key 126, and (2) relevant policy information, such as expiry and output control information. The security token may, in some cases, include additional information. The playlist 214 may include a key URI that specifies the location of the key server 130. For example, the key URI may have the following format: "https://remote-keyserver/key?token=Xbox SecurityToken", where "remote-keyserver" is the URL of the key server 130, and "XboxSecurityToken" is the signed security token. Note that inherently Hypertext Transfer Protocol Secure (HTTPS) is a secure protocol that prevents network traffic attacks, although it will be understood that secure communications protocols other than HTTPS can be used.

As indicated at reference number 5, after obtaining the playlist 214, the game console 110 is configured to send a content key request to the key server, which includes the signed security token 216 (for the content key and policy) and the access token 210 (for client authentication). As mentioned above, an SSO model can be used to authenticate the game console 110 for playing back the protected content 122. In general, SSO includes utilizing an authentication server that has a trusted relationship with the content owner. In this case, the key server 130 may act as the authentication server since the key server and security token service 140 can have a trusted relationship, such as discussed above. Upon receiving the content key request, the key server 130 first authenticates the game console 110 by validating the access token 210 following the SSO model. If the authentication succeeds, the key server 130 then decrypts the encrypted content key encoded in the security token 216 using a private cryptographic key 136 held by the key server, and returns the decrypted content key 218 to the game console 110, as indicated at reference number 6. The decrypted content key 218 can be used by the game console 110 to decrypt and play the encrypted content 212. In this manner, no secret information, such as a private key or certificate, is stored by the game console client application 112, and the client authentication is achieved using a SSO model.

In some cases, before sending the decrypted content key 218 to the game console 110, the key server 130 can extract the policy from the security token 216 to examine the expiry information (e.g., a DRM technology that prevents access to content after a specified date or time) and obtain any output control information (e.g., a DRM technology that can be used to disable output of clear content). If the security token 216 is not expired, the key server 130 can send the decrypted content key 218 and output control information, if any, to the game console 110 as an HTTPS response (or a response via another secure protocol), as indicated at reference number 6. Otherwise, the content key 218 is not sent to the game console 110.

Example Methodologies

Figure 3:
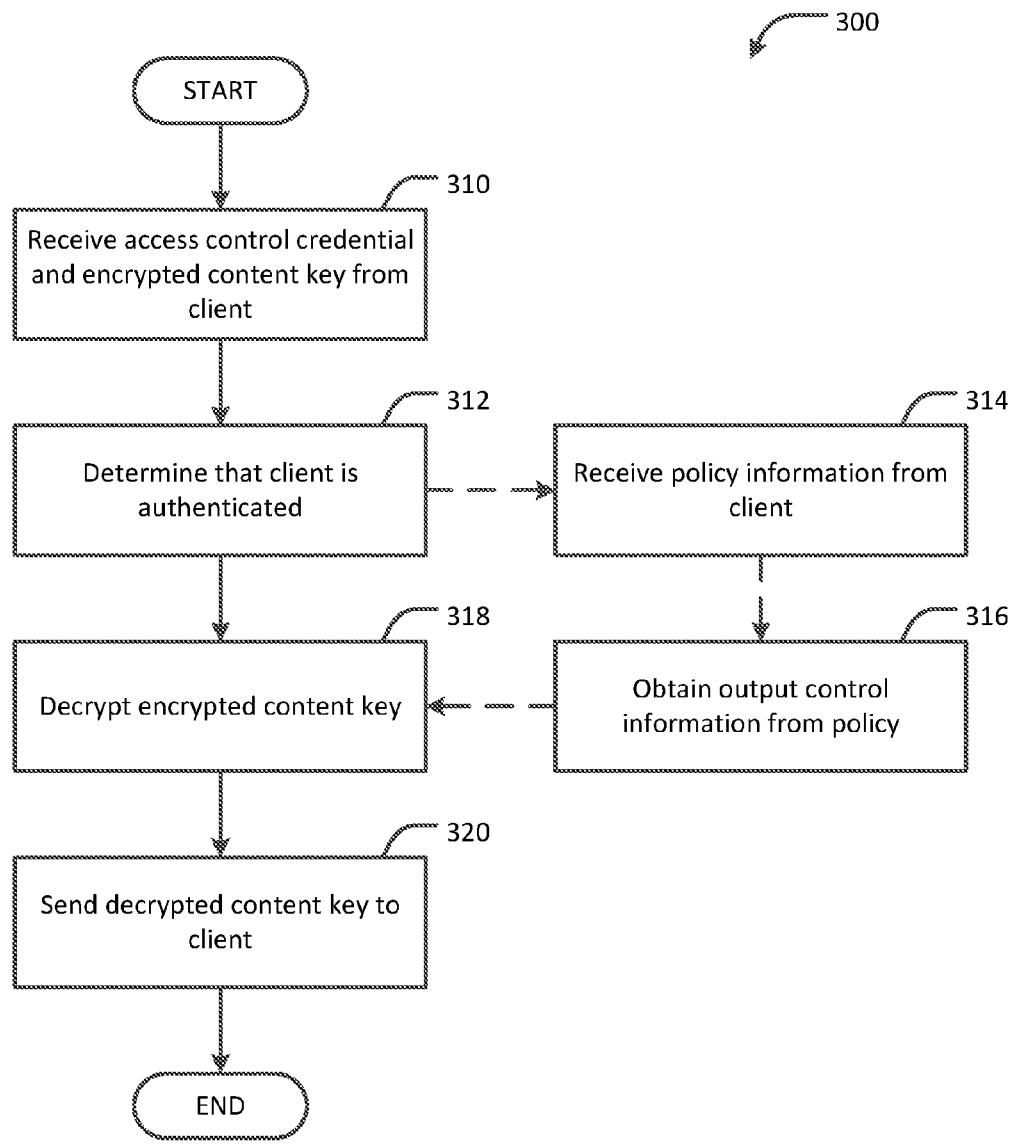
FIG. 3 shows an example server-side methodology for protected video streaming in accordance with an embodiment of the present invention.

FIG. 3 shows an example server-side methodology 300 for protected video streaming in accordance with an embodiment. The method 300 may be implemented, for example, on the key server 130 of FIGS. 1 and 2. The method 300 begins by receiving (310) an access control credential and an encrypted content key, such as encoded in the access token 210 and the signed security token 216 described with respect to FIG. 2, from a client computing device, such as the game console 110 of FIGS. 1 and 2. The access control credential and the encrypted content key can be received via a communication network using a secure communications protocol, such as HTTPS. The method 300 continues by determining (312) that the client is authenticated based on the access control credential. Authentication may be via the SSO model, such as described above. In some embodiments the method continues by receiving (314) policy information from the client. The policy information may include expiry information and other output control information associated with the protected content. The method continues by obtaining (316) the output control information from the policy if, for example, the expiration date or time has not elapsed (e.g., if the policy is valid). If the client is authenticated, the method continues by decrypting (318) the encrypted content key using, for example, a private cryptographic key that is associated with a public cryptographic key that was used to encrypt the content key (e.g., by the content server 120). As noted above, the encrypted content key may be encoded in the security token 216. The method continues by sending (320) the decrypted content key to the client using a secure communication protocol, such as HTTPS. The decrypted content key is configured for use by the client computing device for accessing encrypted content from a content server, such as the protected content 122 distributed by the content server 120 of FIGS. 1 and 2. In some cases, some or all of the functions variously described in this paragraph can be performed in any order and at any time by one or more different processors.

Figure 4:
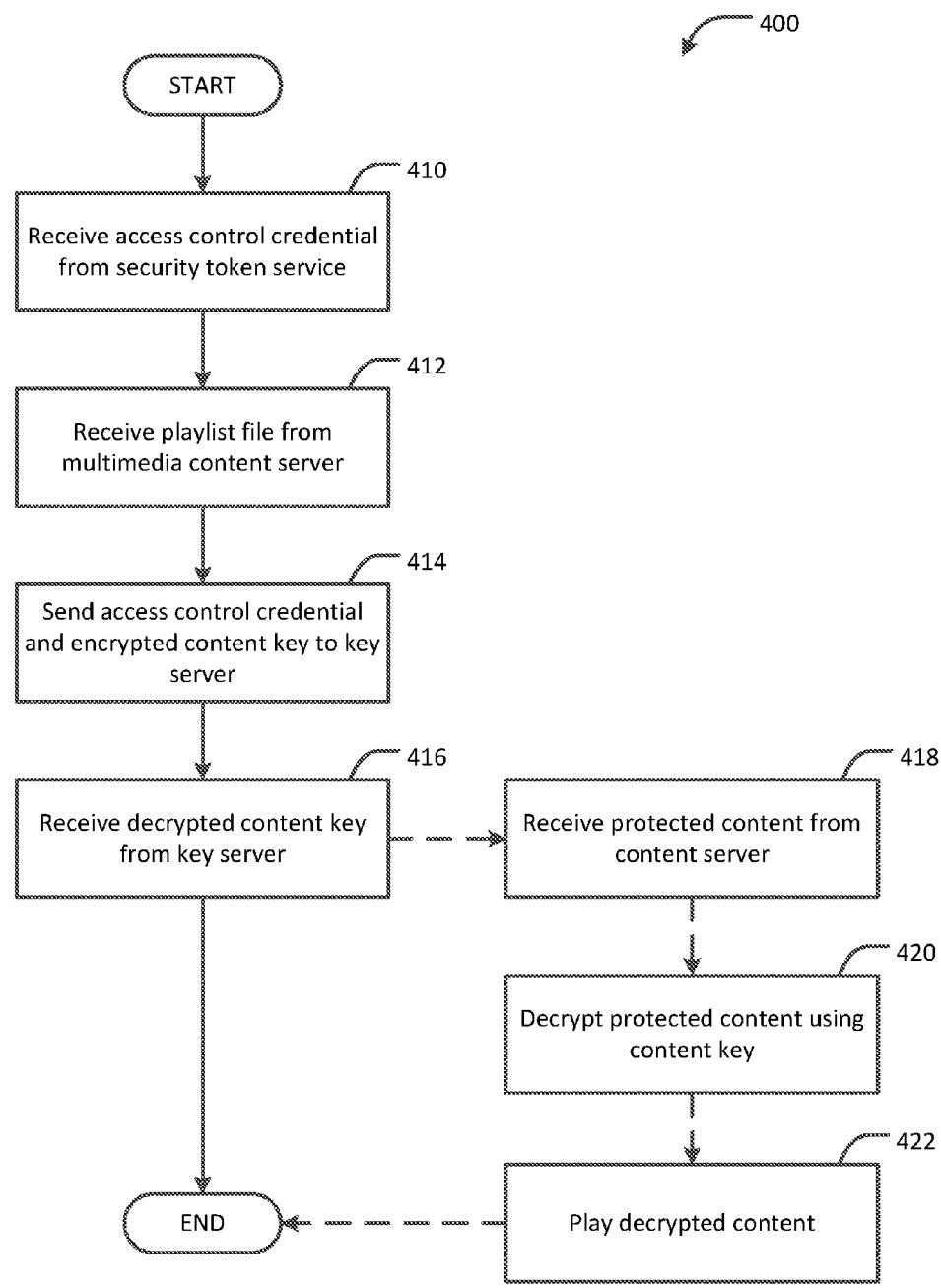
FIG. 4 shows an example client-side methodology for protected video streaming in accordance with an embodiment of the present invention.

FIG. 4 shows an example client-side methodology 400 for protected video streaming in accordance with an embodiment. The method 400 may be implemented, for example, on the game console 110 of FIGS. 1 and 2, (e.g., Xbox 360®). The method 400 begins by receiving (410) an access control credential from a security token service via a communications network. The access control credential may include a single sign on token. The method 400 continues by receiving (412), from a multimedia content server via the communications network, a playlist file having encoded therein a uniform resource identifier (URI) associated with a key server and a security token signed by the multimedia content server. In some cases, the URI is encoded in a format comprising "https://remote-keyserver/key?token=XboxSecurityToken", where "remote-keyserver" represents a URL of the key server, and "XboxSecurityToken" represents the security token. An encrypted content key associated with protected multimedia content can be encoded in the security token. The method 400 continues by sending (414) the access control credential and the encrypted content key to the key server via the communications network using a secure communications protocol. In some cases, the secure communications protocol includes Hypertext Transfer Protocol Secure (HTTPS). The method 400 continues by receiving (418) a decrypted content key from the key server via the communications network using the secure communications protocol. The decrypted content key is configured for accessing the protected multimedia content. In some embodiments, the method 400 continues by receiving (418) the protected content from the multimedia content server via the communications network, decrypting (420) the protected content using the decrypted content key, and playing (422) the decrypted content. In some cases, the protected content can be played back using a HTTP Live Streaming (HLS) player. In some cases, some or all of the functions variously described in this paragraph can be performed in any order and at any time by one or more different processors.

Figure 5:
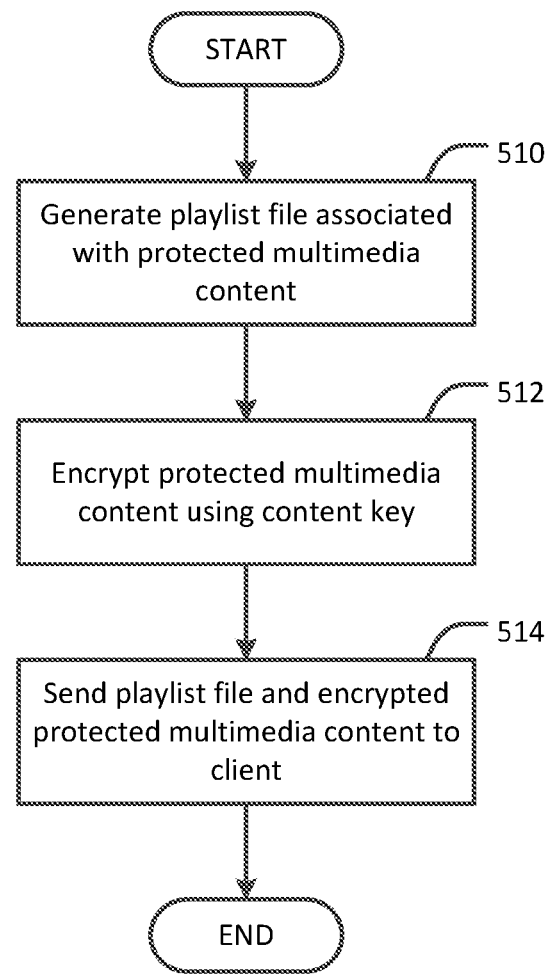
FIG. 5 shows another example server-side methodology for protected video streaming in accordance with an embodiment of the present invention.

FIG. 5 shows an example server-side methodology 500 for protected video streaming in accordance with an embodiment. The method 500 may be implemented, for example, on the content server 120 of FIGS. 1 and 2. The method 500 begins generating (510) a playlist file associated with protected multimedia content. The playlist file has encoded therein a uniform resource identifier (URI) associated with a key server and a security token signed by the content server. In some embodiments, the method 500 includes encoding the URI in a format comprising "https://remote-keyserver/key?token=Xbox SecurityToken", where "remote-keyserver" represents a URL of the key server, and "XboxSecurityToken" represents the security token. An encrypted content key associated with the protected multimedia content can be encoded in the security token. The method 500 continues by encrypting (512) the protected multimedia content using a content key. The method 500 continues by sending (514) the playlist file and the protected multimedia content to a client computing system via a communication network using a secure communications protocol. In some cases, the secure communications protocol includes Hypertext Transfer Protocol Secure (HTTPS). In some embodiments, the method 500 includes encoding policy information associated with the protected multimedia content in the playlist file. In some cases, some or all of the functions variously described in this paragraph can be performed in any order and at any time by one or more different processors.

Example Computing Device

Figure 6:
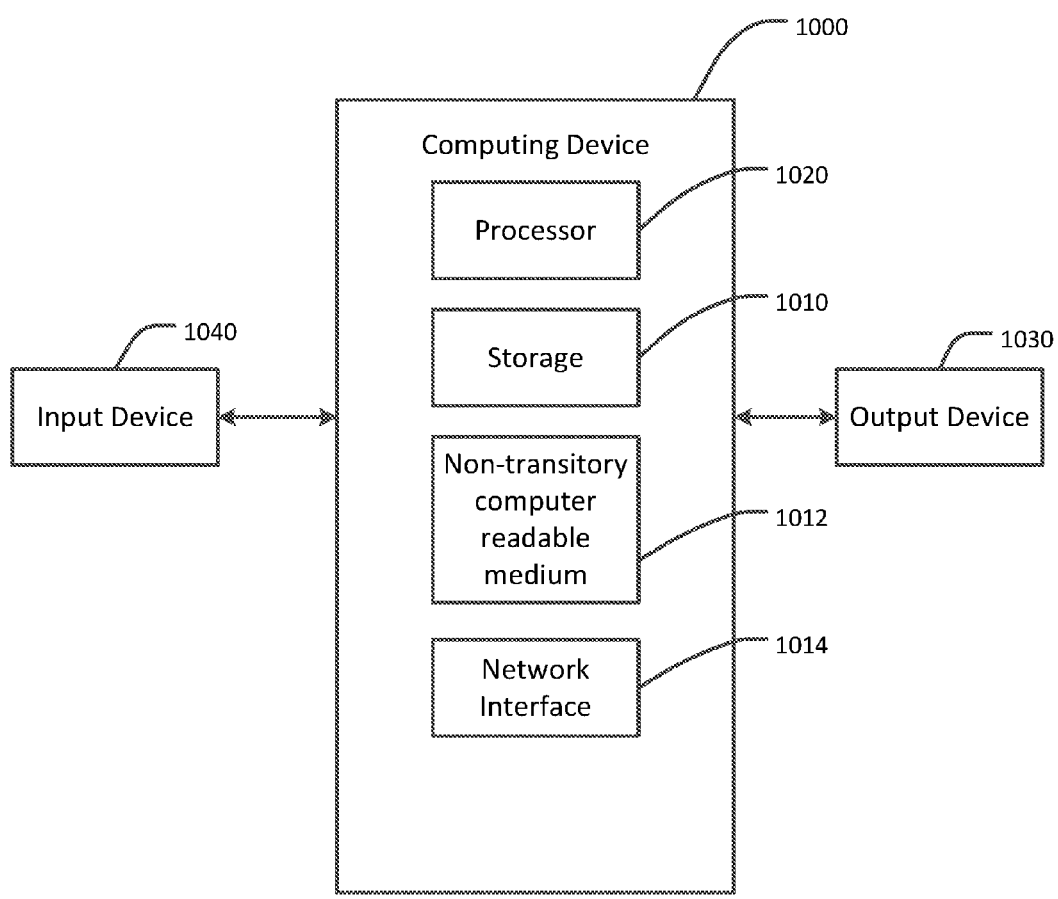
FIG. 6 is a block diagram representing an example computing device that may be used in accordance with an embodiment of the present invention.

FIG. 6 is a block diagram representing an example computing device 1000 that may be used to perform any of the techniques as variously described herein. For example, the game console 110, the content server 120, the key server 130, the security token server 140, or any combination of these (such as described with respect to FIGS. 1 and 2) may be implemented in the computing device 1000. The computing device may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 1010 may include other types of memory as well, or combinations thereof. The storage device 1010 may be provided on the computing device or provided separately or remotely from the computing device. The non-transitory computer-readable media 1012 may include, but are not limited to, one or more types of hardware memory, non-transitory tangible media (for example, one or more magnetic storage disks, one or more optical disks, one or more USB flash drives), and the like. The non-transitory computer-readable media 1012 included in the computing device 1000 may store computer-readable and computer-executable instructions or software for implementing various embodiments. The computer-readable media 1012 may be provided on the computing device 1000 or provided separately or remotely from the computing device.

The computing device 1000 also includes at least one processor 1020 for executing computer-readable and computer-executable instructions or software stored in the storage device and/or non-transitory computer-readable media and other programs for controlling system hardware. Virtualization may be employed in the computing device 1000 so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1030, such as a screen or monitor, which may display one or more user interfaces provided in accordance with some embodiments. The output device 1030 may also display other aspects, elements and/or information or data associated with some embodiments. The computing device 1000 may include other I/O devices 1040 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described herein. The computing device 1000 may include a network interface 1014 for communicating with other devices via a network, such as the Internet.

The computing device 1000 may run any operating system, such as any of the versions of the Xbox 360® operating system, Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIGS. 1 and 2, such as the client application 112, the library 114, the ADK 116, the content packager 124, the token verification module 132, and the key service 134, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the user computing system, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Further Examples

Numerous embodiments will be apparent in light of the present disclosure, and features described herein can be combined in any number of configurations. One example embodiment provides a system including a storage having at least one memory, and one or more processors each operatively coupled to the storage. The one or more processors are configured to carry out a process including receiving, from a client computing device via a communications network using a secure communications protocol, an access control credential and an encrypted content key associated with protected multimedia content; determining that the client computing device is authenticated based on the access control credential; in response to the determination, decrypting the encrypted content key using a private cryptographic key; and sending the decrypted content key to the client computing device via the communications network using the secure communications protocol, the decrypted content key being configured for use by the client computing device for accessing the protected multimedia content. In another example embodiment, the one or more processors are configured to carry out a process including receiving an access control credential from a security token service via a communications network; receiving, from a multimedia content server via the communications network, a playlist file having encoded therein a uniform resource identifier (URI) associated with a key server and a security token signed by the multimedia content server, the security token having encoded therein an encrypted content key associated with protected multimedia content; sending the access control credential and the encrypted content key to the key server via the communications network using a secure communications protocol; receiving a decrypted content key from the key server via the communications network using the secure communications protocol, the decrypted content key being configured for accessing the protected multimedia content; and playing back the protected multimedia content using the decrypted content key. In yet another example embodiment, the one or more processors are configured to carry out a process including generating a playlist file associated with protected multimedia content, the playlist file having encoded therein a uniform resource identifier (URI) associated with a key server and a signed security token having encoded therein an encrypted content key associated with the protected multimedia content; encrypting the protected multimedia content using a public cryptographic the content key; and sending the playlist file and the protected multimedia content to a client computing system via a communication network using a secure communications protocol. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for secure playback of protected multimedia content using a secret-less application, the method comprising:
receiving, by a client application executing on a game console, an access control credential from a security token service via a communications network;
receiving, by the client application and from a multimedia content server via the communications network, a playlist file having encoded therein a uniform resource identifier (URI) associated with a key server and a security token signed by the multimedia content server, the security token having encoded therein an encrypted content key associated with protected multimedia content;
sending, by a development kit application executing on the game console separately from the client application, the access control credential and the encrypted content key to the key server via the communications network using a secure communications protocol;
receiving, by the development kit application, a decrypted content key from the key server via the communications network using the secure communications protocol, the decrypted content key being configured for accessing the protected multimedia content;
decrypting, by the development kit application, the protected multimedia content using the decrypted content key; and
playing back, by the client application, the decrypted protected multimedia content such that the decrypted content key is not stored or used by the client application for playing back the decrypted protected multimedia.

2. The method of claim 1, further comprising receiving the protected multimedia content from the multimedia content server via the communications network.

3. The method of claim 2, wherein the protected multimedia content is encrypted, and wherein the method further comprises decrypting the protected multimedia content using the decrypted content key.

4. The method of claim 1, wherein the URI is encoded in a format comprising "https://remote-keyserver/key?token=XboxSecurityToken", where "remote-keyserver" represents a uniform resource locator (URL) of the key server, and "XboxSecurityToken" represents the security token.

5. The method of claim 1, wherein the secure communications protocol includes Hypertext Transfer Protocol Secure (HTTPS).

6. The method of claim 1, wherein the access control credential includes a single sign on token.

7. The method of claim 1, wherein the playing is performed using a HTTP Live Streaming (HLS) player.

8. The method of claim 1, further comprising:
determining, by the key server, that the game console is authenticated based on the access control credential;
in response to the determination, decrypting, by the key server, the encrypted content key using a private cryptographic key; and
sending, by the key server, the decrypted content key to the game console via the communications network using the secure communications protocol.

9. The method of claim 8, wherein the access control credential includes a single sign on token, and wherein the determining is performed according to a single sign on authentication model.

10. The method of claim 1, wherein the encrypted content key is encoded within a security token signed by a multimedia content server associated with the protected multimedia content.

11. The method of claim 1, further comprising receiving, by the key server and from the game console via the communications network using the secure communications protocol, policy information associated with the protected multimedia content.

12. The method of claim 11, further comprising obtaining, by the key server, output control information from the policy information.

13. The method of claim 11, further comprising determining, by the key server, that the encrypted content key is valid based on expiry information encoded in the policy information.

14. The method of claim 11, wherein the policy information is encoded with the security token.

15. The method of claim 1, further comprising:
generating, by the key server, a playlist file associated with protected multimedia content, the playlist file having encoded therein a uniform resource identifier (URI) associated with a key server and a signed security token having encoded therein an encrypted content key associated with the protected multimedia content;
encrypting, by the key server, the protected multimedia content using the content key; and sending the playlist file and the protected multimedia content from the key server to the game console via the communication network using the secure communications protocol.

16. The method of claim 15, further comprising encoding the URI in a format comprising "https://remote-keyserver/key?token=XboxSecurityToken", where "remote-key-server" represents a uniform resource locator (URL) of the key server, and "XboxSecurityToken" represents the security token.

17. The method of claim 15, further comprising encoding policy information associated with the protected multimedia content in the playlist file.

18. The method of claim 15, wherein the secure communications protocol includes Hypertext Transfer Protocol Secure (HTTPS).

19. A system for secure playback of protected multimedia content using a secret-less application, the system comprising:
   a storage;
   a game console comprising one or more computer processors operatively coupled to the storage; and
   a key server comprising one or more computer processors operatively coupled to the storage;
   wherein the one or more computer processors are configured to execute instructions stored in the storage that when executed cause the one or more computer processors to carry out a process comprising:
   receiving, by a client application executing on the game console, an access control credential from a security token service via a communications network;
   receiving, by the client application and from a multimedia content server via the communications network, a playlist file having encoded therein a uniform resource identifier (URI) associated with a key server and a security token signed by the multimedia content server, the security token having encoded therein an encrypted content key associated with protected multimedia content;
   sending, by a development kit application executing on the game console separately from the client application, the access control credential and the encrypted content key to the key server via the communications network using a secure communications protocol;
   determining, by the key server, that a client computing device is authenticated based on the access control credential;
   in response to the determination, decrypting, by the key server, the encrypted content key using a private cryptographic key;
   sending, by the key server, the decrypted content key to the client computing device via the communications network using the secure communications protocol, the decrypted content key being configured for accessing the protected multimedia content;
   receiving, by the development kit application, the decrypted content key from the key server via the communications network using the secure communications protocol; and
   playing back, by the client application, the decrypted protected multimedia content such that the decrypted content key is not stored or used by the client application for playing back the decrypted protected multimedia.

20. The system of claim 19, wherein the system further comprises a content server comprising one or more computer processors operatively coupled to the storage; and wherein the process further comprises:
   generating, by the content server, a playlist file associated with protected multimedia content, the playlist file having encoded therein a uniform resource identifier (URI) associated with a key server and a signed security token having encoded therein an encrypted content key associated with the protected multimedia content;
   encrypting, by the content server, the protected multimedia content using the content key; and
   sending, by the content server, the playlist file and the protected multimedia content to the client application via the communication network using the secure communications protocol.

* * * * *